(12) United States Patent
Tsai

(10) Patent No.: US 6,529,364 B1
(45) Date of Patent: Mar. 4, 2003

(54) CAPACITOR WITH PROTECTION DEVICE

(75) Inventor: Liao-Tai Tsai, Taipei (TW)

(73) Assignee: Real Power Cap Company, Taipei (TW)

( * ) Notice: Subject to any disclaimer, the term of this patent is extended or adjusted under 35 U.S.C. 154(b) by 0 days.

(21) Appl. No.: 10/040,637

(22) Filed: Jan. 9, 2002

(51) Int. Cl.[7] ............................................... H01G 5/019
(52) U.S. Cl. ..................... 361/272; 361/275; 361/278; 361/279
(58) Field of Search ................................. 361/272, 273, 361/278, 15, 279, 534, 766, 780, 782, 311, 302, 306.1, 275

(56) References Cited

U.S. PATENT DOCUMENTS

| | | | | |
|---|---|---|---|---|
| 4,112,474 A | * | 9/1978 | Wilson et al. | |
| 4,296,453 A | * | 10/1981 | Aigle et al. | |
| 4,577,257 A | * | 3/1986 | Erhardt et al. | |
| 6,278,919 B1 | * | 8/2001 | Hwang et al. | |
| 6,282,078 B1 | * | 8/2001 | Tsai | |
| 6,342,833 B2 | * | 1/2002 | Tsai | |

* cited by examiner

*Primary Examiner*—Chau N. Nguyen
*Assistant Examiner*—Nguyen T Ha
(74) *Attorney, Agent, or Firm*—Birch, Stewart, Kolasch, and Birch, LLP

(57) ABSTRACT

A capacitor with protection device is mainly used to distribute power supply, and to protect capacitor load. The invention can not only display electrical characteristics, but also distribute electric power to every loader. Furthermore, it can protect the capacitor and load by a protection device, and it saves the time and money necessary to install a protection element.

8 Claims, 6 Drawing Sheets

CAPACITOR WITH PROTECTION DEVICE

BACKGROUND OF THE INVENTION

The invention relates to a capacitor with a protection device, and more particularly to a car audio capacitor with a power supply distributor having protection functions.

Automotive batteries are usually used to supply the power of a car. However, the power of the battery is inadequate when it comes to handling the specific job of outputting a huge amount of current in a short time, as required by a car stereo. Therefore, the car audio system is usually equipped with a capacitor or a capacitor module parallel therewith. Referring to FIG. 1, a capacitor is connected to a power loader; the capacitor module is installed to enable the audio 81 and amplifier 82 to discharge quickly when a large amount of current is needed. Besides, the added capacitor or capacitor module also can be used as a filter.

Although there are advantages in the above-mentioned design, it causes damage to the capacitor, the car stereo and even to the user when the positive and negative electrodes of the capacitor are connected incorrectly. And, it is not convenient to use the capacitor. For example, when a user wants to get the voltage value of the electricity system of the car, an additional meter is needed. It is inconvenient to use a meter for measurement, and one must take time to learn how to use the meter if s/he is not familiar with it.

Besides, an electric wire must be used, additional anode and cathode power supply distributors 20 and 30 must be installed, and a protection device 23 is disposed to protect the capacitor and car electrical system when the capacitor is installed in the car. Such equipment is complicated and the installment described above is inconvenient. Therefore, time and money can be saved if the power supply distributors and protection device of the car electrical system are combined together.

The object of the invention is to provide a car audio capacitor with more functions, that is capable of not only showing the electrical power characteristics, but also of distributing the power supply and protecting load to the capacitor so as to let the user connect the electric wire onto the capacitor directly. Thereby, the time and money expenses required by the additional installment of power supply distributors and protection devices can be saved.

Accordingly, the invention provides a capacitor with power supply distributors and protection devices. It mainly installs a protection device in the anode power supply distributor to protect the capacitor and loader device. And, a digital display is mounted so that the invention can not only display electrical characteristics and distribute the electric power directly to each loader device, but can also protect the capacitor and loader device with the protection device. Thereby, the time and money expenses required by the additional installment of power supply distributors and external protection devices can be saved.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE PREFERRED EMBODIMENTS

Figure 1:
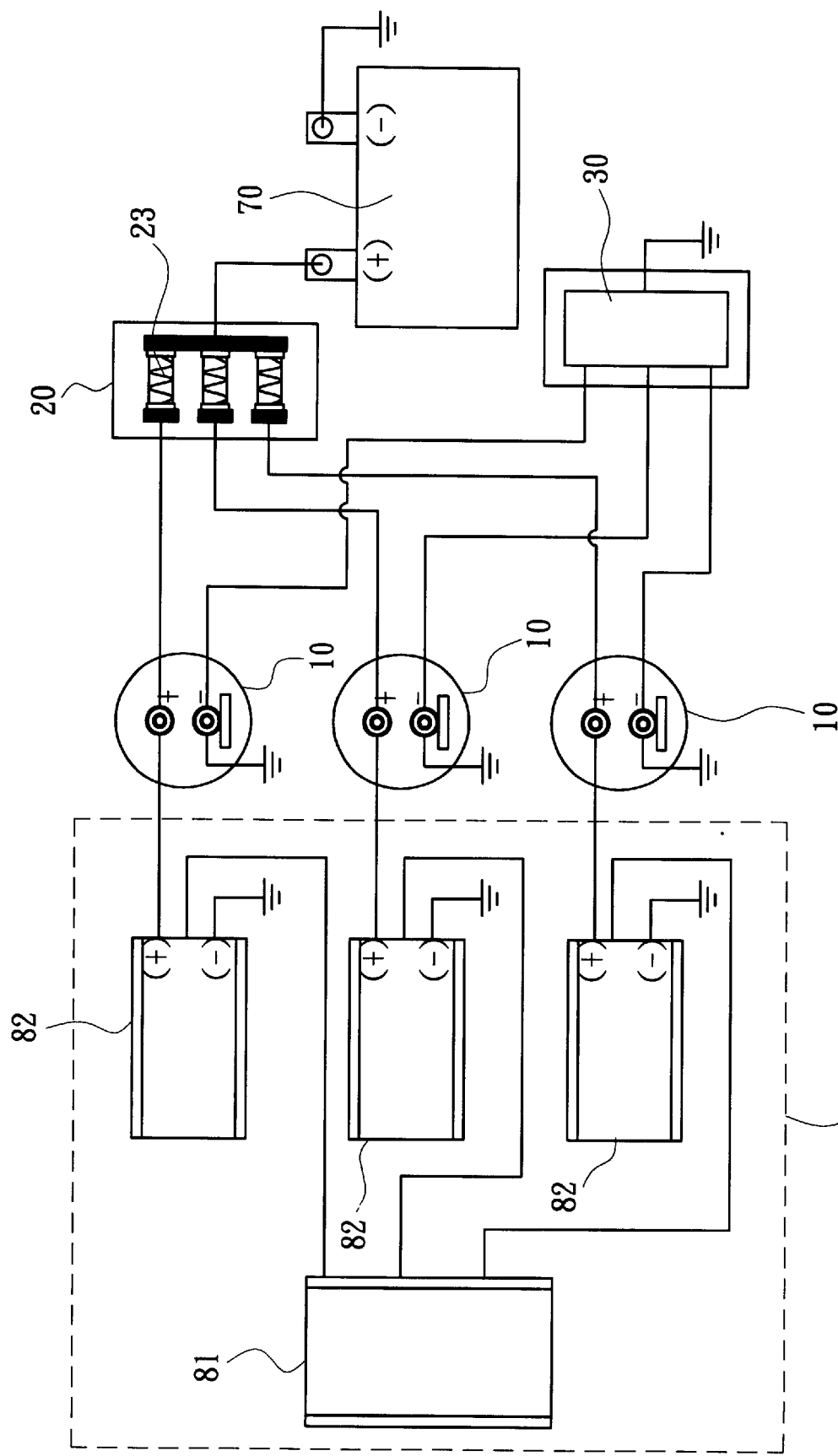
FIG. 1 is a schematic view showing the connection between the capacitor and electric power loader device of the prior art.
Figure 2:
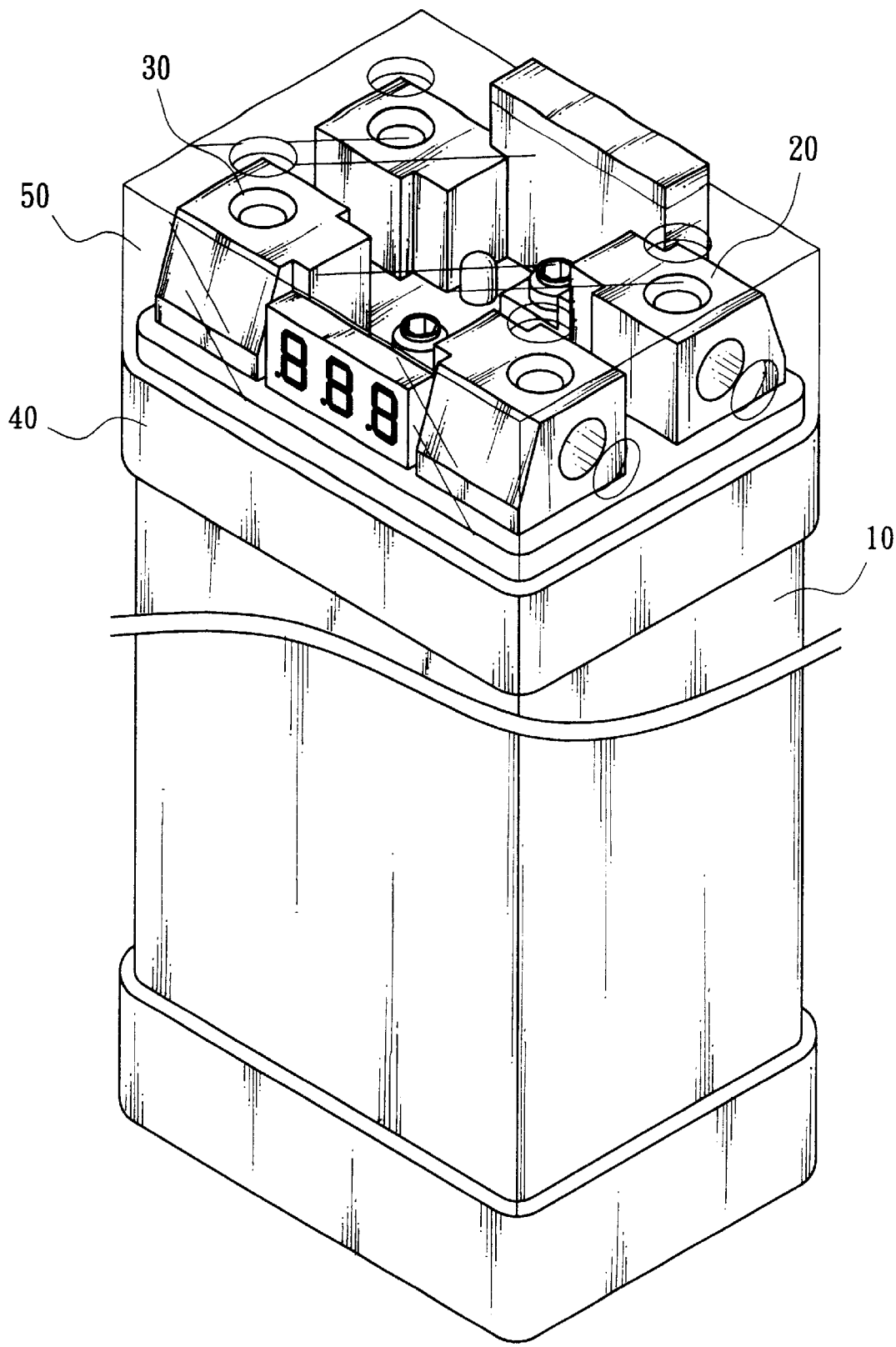
FIG. 2 is a schematic view of a preferred embodiment of the invention showing a capacitor with a protection device.

Please refer to FIG. 2, which illustrates a capacitor body 10, anode power supply distributors 20 and cathode power supply distributors 30, which are integrated with a circuit module 40 into one body, upon which a protection cover is mounted. A protection device is installed between cathode power supply distributors 20. Thereby, a capacitor with a protection device is completed. This provides protection for the capacitor and electric power loader device through the use of the invention.

Figure 3:
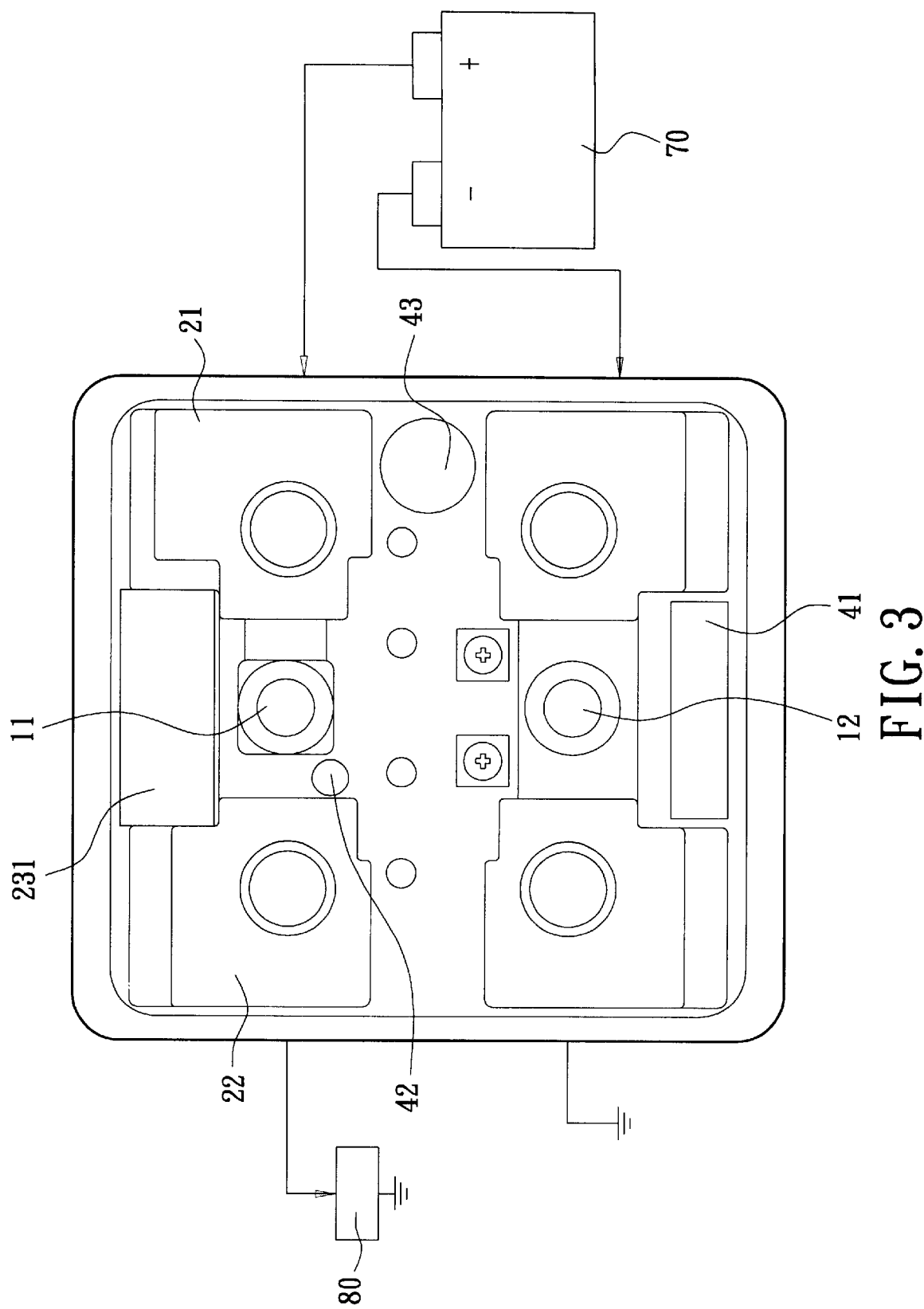
FIG. 3 is a front view of a preferred embodiment of the invention showing a capacitor with a protection device.

FIG. 3 shows a preferred embodiment of the capacitor with protection device according to the invention. As the figure shows, the capacitor comprises an anode terminal 11 and cathode terminal 12. The anode terminal 11 is passed through the circuit module 40 to connect with a first conductor 21 of the anode power supply distributor 20, and the cathode terminal 12 is also passed through the circuit module 40 to connect with the cathode power supply distributor 30. Moreover, a digital display 41 is mounted on the circuit module 40. The digital display 41 is used to detect and display the state of the capacitor body 10. A second conductor 22 is further installed in the anode power supply 20. A protection element is disposed between the first conductor 21 and second conductor 22; the protection element is a plug type fuse 231.

The invention also has a state indication element 42 and state warning element 43 installed therein. The state indication element 42 is a LED, and the state warning element 43 is a speaker. The state indication element 42 lights up when the protection element works normally and is off when the protection element has a broken circuit. Meanwhile, the state warning element 43 emits a warning sound. The state warning element 43 not only emits a warning sound when the protecting element has a broken circuit, but also has the function of detecting voltage. The warning element 43 emits a warning sound when the voltage is higher than 16V or lower than 11V.

The first conductor 21 is connected to the anode of a car battery 70, and one end of the cathode power supply distributor 30 is connected to the cathode of the battery 70. The second conductor 22 and the other end of the cathode power supply distributor 30 are connected to the electric power loader 80. Thereby, the electric power of the battery 70 is transmitted to the electric power loader 80 through the circuit arrangement mentioned above. Therefore, the electric power loader 80 can charge the capacitor. Electric power must pass through the protection element first when it is transmitted to the electric power loader 80 so that the protection of the capacitor 10 and electric power loader 80 can be obtained.

Figure 4:
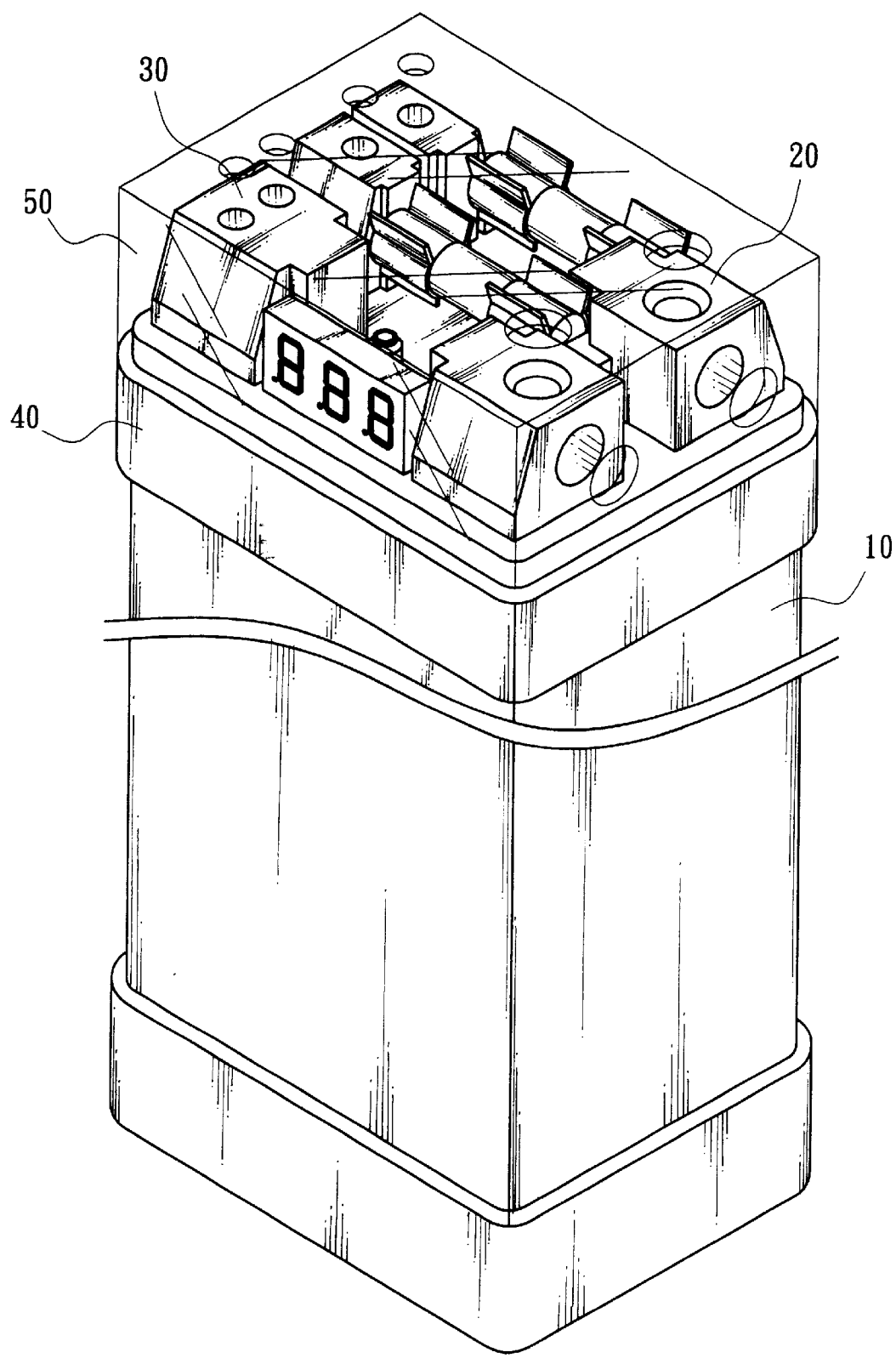
FIG. 4 is a schematic view of another preferred embodiment of the invention showing a capacitor with a protection device.
Figure 5:
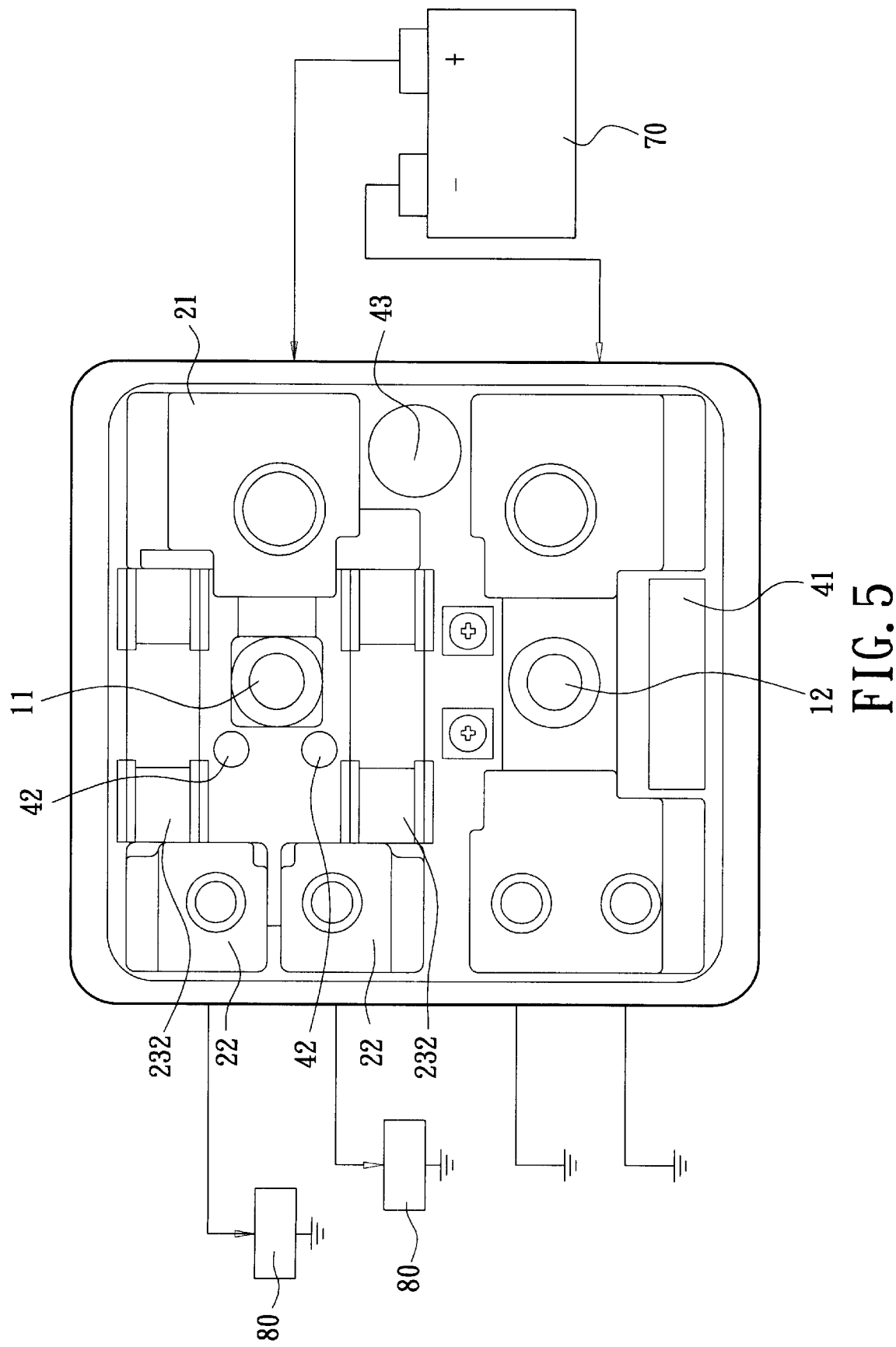
FIG. 5 is a front view of another preferred embodiment of the invention showing a capacitor with a protection device.

Please refer to FIGS. 4 and 5, which show another embodiment of the capacitor with protection device of the invention.

First, as shown in FIG. 4, the same capacitor body 10, anode power supply distributor 20, cathode power supply distributor 30, circuit module 40 and protection cover 50 are installed. Next, as in FIG. 5, the difference between the second and first embodiment mentioned above is that the first conductor 21 of the anode power supply distributor 20 is connected with a plurality of protection elements. The protection elements are plug type fuses 232. A plurality of second conductors is also installed at the anode power supply distributor 20. One end of the protection element is connected to the first conductor 21 and another end thereof is connected to the second conductors 22. Here, the state warning element 43 and a plurality of state indication elements 42 are disposed accordingly in this embodiment. As mentioned above, the state indication elements 42 are also used to display the work state of each protection element, and the sate warning element 43 is also used to emit a warning sound when the voltage is abnormal or when the protection elements have a short circuit. A plurality of wire holes is also disposed in the cathode power supply distributor 30 for direct distribution of power.

Figure 6:
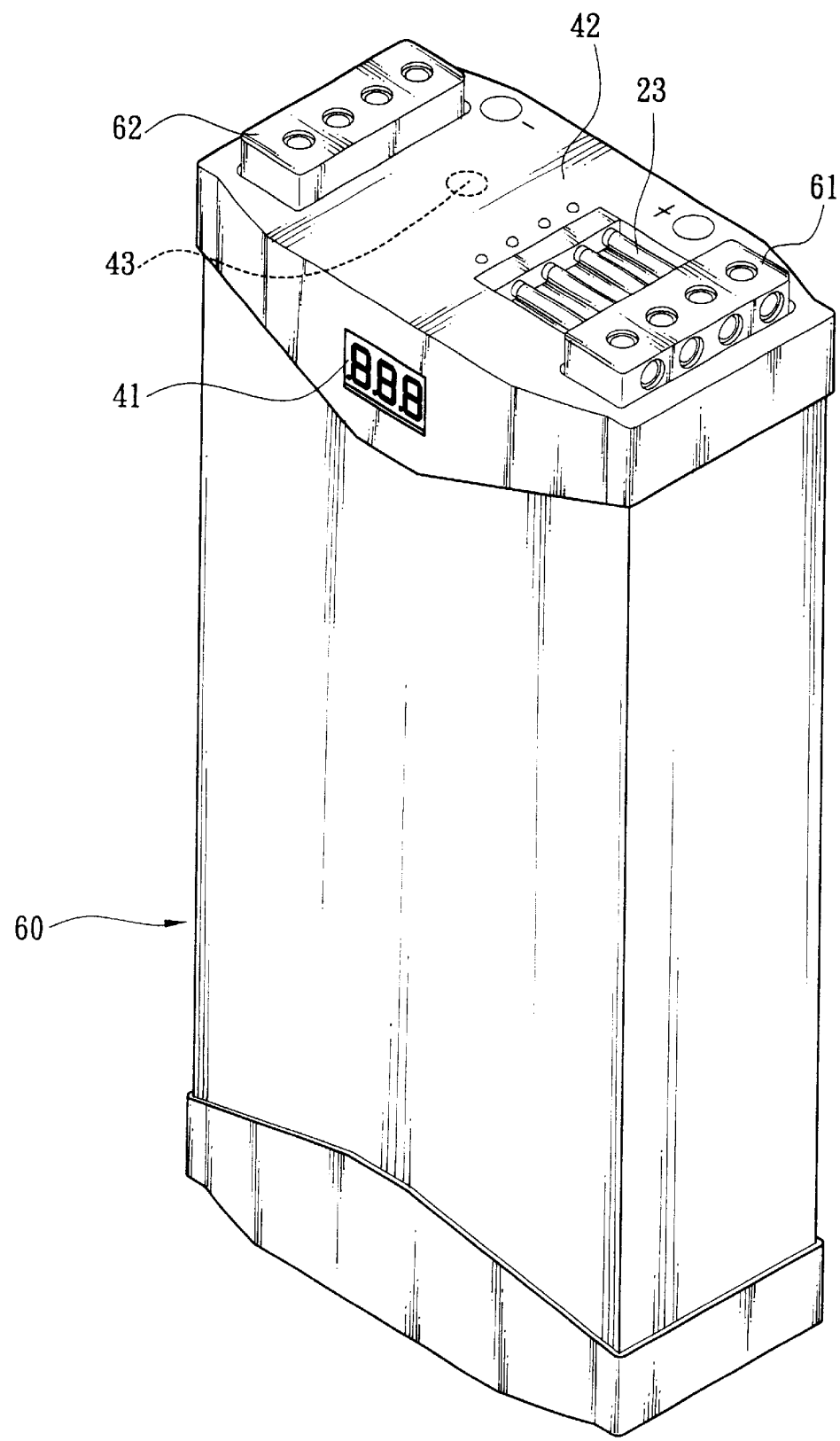
FIG. 6 is a schematic view of still another preferred embodiment of the invention showing a capacitor with a protection device.

FIG.6 shows a capacitor of still another embodiment of the invention. The capacitor at least comprises: a capacitor module 60 assembled by at least one capacitor body 10, an anode extension board 61, a cathode extension board 62 and a protection device 23. The capacitor module 60 is used to provide the working power of the electric power loader 50. The circuit module, which is disposed with a digital display thereon, is installed in the capacitor module 60. The digital display 41 can be a LCD or seven steps display. The circuit module 40 is used to detect the electric power state of the capacitor module 60 and the digital display 41 is used to display this state.

A plurality of wire holes and connecting holes disposed in the anode extension board 61 is used to distribute the anode power supply of the capacitor module. At least one set of wire holes and connecting holes disposed in the cathode extension board 62 is used to distribute the cathode power supply of the capacitor module 60. A protection element, state indication element 42 and state warning element 43 are disposed in the protection device 23. The protection element can be a general fuse 232 or a plug type fuse 231. Its input end is connected to the anode power supply of the capacitor 60, and its output end is connected to the anode extension board 61. The state indication element 42 may be an LED, and is connected to the protection device 23 to form a loop. The state warning element 43 is a speaker.

The protection device 23 forms an open circuit when the working power supply is overloaded in order to protect the capacitor and electric loader 50. The display element 42 lights up during normal operation, and is off when the protection device 23 forms a close circuit. Moreover, the state warning element 43 can detect voltage, and it emits a warning sound when the voltage is higher than 16V or lower than 11V.

The invention provides a capacitor with a power supply distributor in order to distribute power. A protection device is also installed therein to protect the capacitor and electric power loader. Therefore, the invention can reduce the expenses required for installment of a power supply distribution and protection device, and protect the device and circuit.

It is noted that the preferred embodiments of the capacitor with protection device of the invention have been described for the purpose of illustration only, and are not intended as a definition of the limits and scope of the invention disclosed. Any modifications and variations that may be apparent to a person skilled in the art are intended to be included within the scope of the following claims.

What is claimed is:

1. A capacitor with protection device, at least comprising:

at least one capacitor body utilized to combine into a capacitor module;

a circuit module installed on the end of said capacitor module, and at least comprising a digital display, used to detect and display the state of said capacitor module;

an anode extension board, multiple sets of same wire holes and connecting holes further disposed therein, used to distribute anode power supply of said capacitor module;

a cathode extension board, at least a set of same wire holes and connecting holes further disposed therein, used to distribute cathode power supply of said capacitor module; and a protection device, an input end thereof connected with anode power supply, an output end thereof connected with said anode extension board, used to protect said capacitor and an electric power loader connected with said anode extension board.

2. The capacitor of claim 1, wherein said protection device further comprises:

at least one protection element, utilized to form an open circuit to protect said capacitor and said electric power loader when power supply is overload;

at least one state indication element, used to display the state of said protection element; and a state warning element, utilized to emit a warning sound when said protection element or voltage is abnormal.

3. The capacitor of claim 2, wherein said protection element is a fuse.

4. The capacitor of claim 2, wherein said protection element is a plug type fuse.

5. The capacitor of claim 2, wherein said state indication element is a LED.

6. The capacitor of claim 2, wherein said state warning element is a speaker.

7. The capacitor of claim 1, wherein said digital display is a LED.

8. The capacitor of claim 1, wherein said digital display is a seven steps display.

* * * * *